Figure 1:
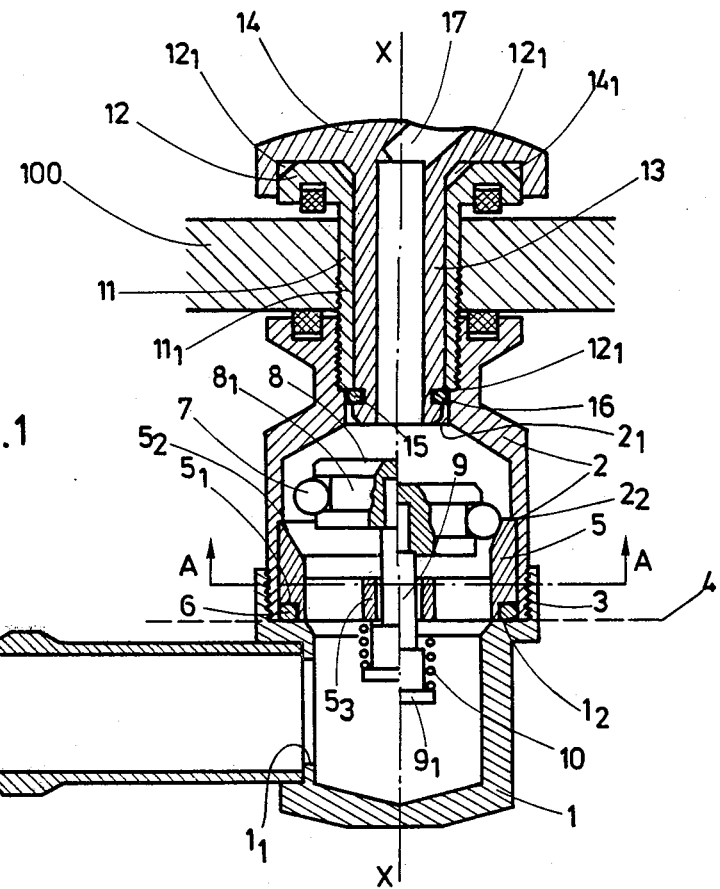

United States Patent [19]

Dupont

[11] 4,387,854
[45] Jun. 14, 1983

[54] NON-RETURN VALVE WITH A DIRECTIONAL INJECTOR

[76] Inventor: Robert Dupont, 7, rue Mirabeau, Paris, France

[21] Appl. No.: 205,507

[22] Filed: Nov. 10, 1980

[30] Foreign Application Priority Data

May 19, 1980 [FR] France .................................. 80 11132
May 20, 1980 [FR] France .................................. 80 11277

[51] Int. Cl.³ .............................................. B05B 1/22
[52] U.S. Cl. .................................... 239/570; 4/492; 4/541; 137/541; 239/587; 239/598; 239/600
[58] Field of Search ............................. 137/541, 542; 239/533.1, 533.15, 570–572, 587, 598, 600; 4/492, 507, 541–544, 567–569; 128/65, 66

[56] References Cited

U.S. PATENT DOCUMENTS

| | | | |
|---|---|---|---|
| 1,260,663 | 3/1918 | Gould et al. | 137/541 |
| 3,393,873 | 7/1968 | Larson | 239/533.15 |
| 3,986,217 | 10/1976 | Doerr et al. | 4/542 |
| 4,185,781 | 1/1980 | O'Brien | 239/600 |
| 4,320,541 | 3/1982 | Neenan | 4/492 |

*Primary Examiner*—Andres Kashnikow
*Attorney, Agent, or Firm*—Spensley, Horn, Jubas & Lubitz

[57] ABSTRACT

This invention concerns a non-return valve having a directional injector, comprising a body provided with a valve seat.

10 Claims, 2 Drawing Figures

NON-RETURN VALVE WITH A DIRECTIONAL INJECTOR

The invention concerns a non-return valve having a directional injector, which is intended in particular for use in a bath for blowing a gas such as air thereinto, to cause agitation of the water in the bath.

It is known for air to be blown into the water in a bath in order to produce an agitation acting creating a massage effect.

Now, the installations which are known in the literature of the art are not satisfactory and are even impossible to construct in practice. In fact, some installations envisage baths with a double bottom, which cannot be put into practice. Other installations do not solve the problem of sealing at the location of the injector.

The aim of the present invention is to provide a non-return valve with an orientable injector, which provides a good seal, which is reliable, which permits automatic cleaning of the valve, and which is easily orientable.

For this purpose, the invention concerns a valve seat which is formed by the fructoconical end of a ring which is terminated at its other end by an end portion provided with orifices for the flow of the fluid and an axial orifice which receives and slidingly guides the rod which is fixed with respect to the disc of the valve, the disc being provided with a peripheral groove receiving a toric seal co-operating in the closed condition with the frustoconical surface, the outlet of the body being provided with a screwthread for receiving the injector which comprises a sleeve provided externally with an end collar, and a tube provided with a head covering the collar, the head comprising an inclined orifice opening into the body, said member being orientable.

In accordance with another feature of the invention, the toric seal is applied against the frustoconical seat by a spring which is disposed around the valve rod and which bears on the one hand against the ring and on the other hand against a head of the rod.

In accordance with another feature of the invention, the body is made in two parts which are assembled by screwing, the toric seal being gripped by way of its ends between two internal grooves formed on each of the parts of the body.

In accordance with another feature of the invention, the collar and the head bear against each other and the tube is provided with an external end groove which is disposed at the height of the free end of the sleeve, said groove receiving a toric seal which bears against said free end of the sleeve.

Figure 2:
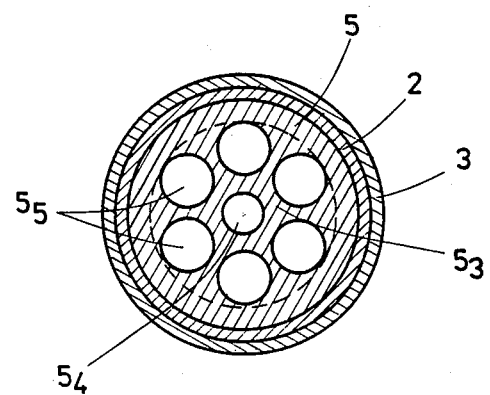

The invention is shown by way of non-limiting example in the accompanying drawings in which:

FIG. 1 shows a view in two axial half-sections, of the valve in the open position and in the closed position, FIG. 2 is a view in section taken along line A—A in FIG. 1.

Referring to FIG. 1, the non-return valve comprises a body comprising two parts 1 and 2, one part 1 being provided with a fluid inlet orifice $1_1$ and the other part 2 being provided with an orifice $2_1$ for the outlet of the fluid. The two parts are joined together by screwing as at 3, in a connecting plane 4.

Disposed within the part 1 is a ring 5 which is gripped between an internal shoulder $1_2$ of the part 1 and an internal seat $2_2$ of the part 2. The end of the ring 5, which is disposed in the plane 4, is provided with a groove $5_1$ in which there is housed a toric seal 6. The seal 6 bears both against the two parts of the body and against the ring 5 in order to form a seal between the two parts of the body, and to provide a seal for each of the two parts 1 and 2 with respect to the ring 5.

The ring 5 is provided on its internal face with a tapered end $5_2$ forming the valve seat for the toric seal 7.

The valve is formed by a disc 8 provided with a peripheral annular groove $8_1$ provided with the toric seal 7; the disc 8 is provided with an axial threaded opening in which a rod 9 provided with a head $9_1$ is screwed.

Referring to FIG. 2, the ring 5 is provided with an end portion $5_3$. The end portion $5_3$ is provided, at its end opposite to the frustoconical end $5_2$, with an axial orifice $5_4$ which is surrounded by other orifices $5_5$. The axial orifice $5_4$ substantially corresponds to the diameter of the rod 9 which it slidably receives, while the orifices $5_5$ are intended to permit the fluid to pass therethrough.

Disposed between the end portion $5_3$ and the head $9_1$ of the rod 9 is a helicoidal spring 10 which tends constantly to apply the toric seal 7 against the frustoconical surface $5_2$.

The upper part of the valve forms the orientable injector. The injector comprises a sleeve 11 which is externally screw-threaded as at $11_1$ and which is provided at one of its ends with an external collar 12.

A tube 13 is rotatably mounted within the sleeve 11, the tube 13 being of corresponding diameter and terminating at one of its ends with a head 14 which covers the collar 12.

The collar 12 is housed in an annular groove $14_1$ in the head 14; the depth of the groove is less than the thickness of the collar so that the base of the collar can come to bear against the internal surface of the wall 100 of the bath, without interferring with rotary movement of the head 14.

The head 14 is applied by way of the bottom of the groove $14_1$ against the upper face of the collar 12, the side edges of which are chamferred as at $12_1$ to facilitate rotary movement of the head.

The opposite end of the tube 13 is provided with an annular groove 15 which is disposed at the height of the free end of the sleeve 11 when the head 14 is in a condition of bearing against the collar 12; the annular groove 15 receives a toric seal 16 which is thus applied against the free end of the sleeve 11 in order to ensure a sealing action without interferring with rotary movement of the head, the periphery of which is knurled in order to facilitate handling thereof.

The sleeve 11 is disposed through openings in the wall of the bath, the collar 12 bearing against the internal surface by means of a nut disposed on the screwthread $11_1$ and bearing against the external surface.

The head 14 is provided with an orifice 17 which is inclined with respect to the axis X—X of the orifice of the tube 13 with which it is in communication, the inclined position of the orifice 17 permitting orientation of the jet of air by means of rotation of the head 14.

The injector is screwed into the screwthread of the outlet orifice $2_1$ of the body 1, said two components bearing sealingly against the two faces of the wall 100 of the bath.

In operation, when a fluid under pressure is introduced by way of the orifice $1_1$, the pressure applied to the valve 8 of the spring 10 moves the toric seal 7 away from the frustoconical surface $5_2$ to permit the fluid to flow.

In contrast, when the fluid under pressure is no longer introduced into the orifice $1_1$, the toric seal 7 is applied against the frustoconical surface $5_2$ under the action of the spring 10, providing a seal to prevent the fluid from flowing back from the orifice $2_1$ towards the orifice $1_1$. Upon closure of the valve, the toric seal 7 is progressively applied to the frustoconical surface in order to push back any impurities which may have been deposited thereat, and automatically clean the valve.

When the invention is applied to a bath, a certain number of such injectors may be provided at the bottom of the bath and at the level of the back, without however such a distribution being limiting.

It is also possible to envisage providing reaction vessels or more generally treatment tanks or containers, with such valves including injectors, the orientation of which is for example adjusted manually.

I claim:

1. A fluid injector apparatus for a bath enclosure, comprising:
 a check valve which includes a body having an outlet, a truncated cone-shaped valve seat and a ring member with a bottom portion which defines apertures for the passage of fluid and an axial aperture, said valve further including a disc defining a peripheral groove and having a seal seated therein for sealing engagement with the valve seat, and a rod slidably received in the axial aperture for carrying the disc; and
 a swiveling injector which includes a sleeve having an end flange at one end, said sleeve being threadably received in the valve body outlet, said injector further including a tube rotatably carried within the sleeve and having a head member adapted to substantially cover and bear against the sleeve end flange, said head member defining an oblique aperture, and said tube defining a conduit fluidically coupling the valve outlet to the head member aperture, and an external seal groove around the periphery of the tube, and said injector further including a seal received in the tube seal groove and bearing against the sleeve.

2. The apparatus of claim 1 wherein the rod has a head member at one end and the check valve further comprises a spring disposed around the rod which bears on the one hand against the valve ring member and on the other hand against the rod head to thereby urge the valve disc seal in sealing engagement with the valve seat.

3. The apparatus of claim 1 wherein the valve body comprises two parts each of which has an internal collar, said valve body parts being threadably coupled together wherein the ring member is gripped between the two internal collars of the valve body parts.

4. The apparatus of claim 1 wherein the ring member defines a peripheral recess at one end of its external surface, the check valve further comprising a toric seal received within the ring member peripheral recess, which is positioned in sealing engagement with the junction of the two valve body parts.

5. A fluid injector apparatus for a bath enclosure, comprising:
 a non-return valve which includes a body, a ring member having a frustoconical valve seat at one end and a plurality of fluid orifices and an axial orifice at the other end, a rod slidably carried within the axial orifice, a disc carried by the rod and shaped to sealingly engage the valve seat, said disc defining a peripheral groove and having a toric seal seated in the disc groove; and
 a directional injector threadably coupled to the valve body, which includes a sleeve having an end collar and a tube which has an orientable head portion covering the sleeve end collar, the head portion having an inclined orifice fluidically coupled to the interior of the valve body.

6. The apparatus of claim 5 wherein the rod has a head member at one end and the check valve further comprises a spring disposed around the rod which bears on the one hand against the valve ring member and on the other hand against the rod head to thereby urge the valve disc seal in sealing engagement with the valve seat.

7. The apparatus of claim 5 wherein the valve body comprises two parts each of which has an internal collar, said valve body parts being threadably coupled together wherein the ring member is gripped between the two internal collars of the valve body parts.

8. The apparatus of claim 5 wherein the ring member defines a peripheral recess at one end of its external surface, the check valve further comprising a toric seal received within the ring member peripheral recess, which is positioned in sealing engagement with the junction of the two valve body parts.

9. The apparatus of claim 5 wherein the tube has an external peripheral groove and the apparatus further comprises a seal received in the tube groove which bears against the sleeve.

10. An injector according to any of the preceeding claims wherein the sleeve is externally screw threaded to the valve body.

* * * * *